1

2,771,419

AQUEOUS STARCH-CONTAINING DRILLING MUDS HAVING A REDUCED FILTRATION RATE

Richard A. Salathiel, Houston, Tex., assignor, by mesne assignments, to Esso Research and Engineering Company, Elizabeth, N. J., a corporation of Delaware No Drawing. Application August 15, 1955, Serial No. 528,541

4 Claims. (Cl. 252—8.5)

The present invention is directed to a suspension of finely divided solids in an aqueous medium for use in well drilling operations. More particularly, the invention is directed to a drilling mud having a low filtration rate. In its more specific aspects, the invention is directed to a drilling mud to which has been added filtration reducing materials.

The present invention may be briefly described as involving a drilling mud comprising at least 5% by weight of finely divided solids in an aqueous saline medium having dissolved therein about 2 to 15 percent by weight of salt to which has been added about 1 to 15 pounds of starch and about 0.5 to 5 pounds of glyoxal per 42 gallon barrel of mud.

In the rotary method of drilling boreholes, an aqueous suspension of finely divided solids, commonly referred to as drilling mud, is pumped down the drill stem through the openings in the drill bit and upwardly through the annular space between the drill stem and the walls of the borehole to the surface of the earth. A primary purpose for employing the drilling mud is to pick up the cuttings produced by the drill bit and to transport these cuttings to the surface of the earth. The drilling mud also serves other important functions such as lubricating the bit and the drill stem, cooling the bit, and furnishing a hydrostatic pressure head to prevent flow into the borehole of formation fluid, such as oil, gas, and water, from the various strata penetrated by the drill bit. In certain cases it is highly desirable that the mud form a thin, difficultly permeable coating on the walls of the borehole for the purpose of reducing loss of water from the borehole to the formation and thereby reducing softening of the borehole walls and caving into the drill hole. It is preferable that the filter cake formed on the walls of the borehole be thin rather than thick so as to avoid mechanical difficulties in moving the bit in and out of the hole and in placing casings in the hole.

The aqueous suspensions of finely divided solids employed as a drilling fluid in rotary drilling operations are sometimes prepared by admixing a suitable amount of commercial clay with water. Heavy materials such as barytes, iron oxide, barium sulfate, calcium carbonate, silica, and the like are often added to such a suspension in order to increase its specific gravity. In many cases, however, the drilling fluid used in oil and gas wells is prepared in the process of drilling by dispersing in water the cuttings produced from the borehole. Weighting materials, clays, and chemicals may, of course, be added to the drilling fluid prepared in the last mentioned manner.

Almost any fluid will perform some of the aforementioned functions, such, for example, as cooling the drill bit, but to perform some of the other functions, it is necessary that the drilling fluid employed possess certain very definite properties. For example, a drilling mud may have sufficient gel strength to prevent settling of solids from the mud when circulation of the mud is stopped, but, at the same time, its other properties may be such as to result in the deposition of a thick filter cake on the borehole walls rather than the preferred thin cake. When large amounts of water filter from the mud into the formations surrounding the borehole, the solids content of the mud remains as a filter cake on the wall of the hole, reducing the size of the annular passage. Sloughing of such a thick filter cake or this, together with the caving off of water-softened borehole walls may cause the drill pipe to become stuck. On the other hand, the employment of a drilling fluid having a low filtration rate restricts to a relatively small amount the water that can escape from the mud under the pressure differential prevailing in the borehole. A small loss of water from the mud to the formation means, of course, that only a thin filter cake will be deposited on the borehole walls. Use of the proper mud will help to preserve the borehole walls intact.

Occasionally, drilling muds which have a relatively low filtration rate may be prepared from the material of borehole cuts; however, it has generally been found necessary to incorporate filtration reducing agents into the mud to impart this desirable property thereto. It is common practice to employ starches for this purpose and, while the addition of starch has proved beneficial, there has been much to be desired in the way of performance, particularly with respect to the reduction of filtration rate when the aqueous medium is an aqueous saline medium.

It is, therefore, an object of the present invention to provide a dispersion or suspension of finely divided solid material in an aqueous saline medium having little tendency to lose water by filtration therefrom. Another object of the present invention is to provide a method for reducing the loss of water from an aqueous saline dispersion or suspension of finely divided solid material. Another object of the present invention is to provide a drilling fluid suitable for use in the rotary drilling of boreholes into subsurface formations and having a low filtration rate. Another object of the present invention is to provide an agent which, on addition to the aqueous-base saline drilling fluid used in the drilling of boreholes into subsurface formations, will substantially reduce the loss of water therefrom by filtration. A further object of the present invention is to provide an agent which, on addition to a drilling fluid, will substantially reduce the loss of water therefrom by filtration, but which will not increase excessively the viscosity of the fluid or substantially affect its ability to maintain solids in suspension.

The method of the present invention may be briefly described as involving the addition of a sufficient amount of starch and glyoxal to mixture, dispersion, or suspension of finely divided solid material in an aqueous saline liquid vehicle having dissolved therein about 2 to 15 weight percent of salt to materially reduce the tendency of the mixture, dispersion or suspension to lose water by filtration and the maintenance of the proper amounts of starch and glyoxal therein. By employing the proper amount of a starch and of glyoxal, the water lost by filtration from the dispersion or suspension is reduced to a low value. For example, the water lost by filtration from a drilling mud may be maintained at a low value by maintaining filtration-reducing amounts of starch and glyoxal in the mud.

The composition of the present invention may be described briefly as a mixture comprising finely divided solid material, an aqueous saline vehicle containing about 2 to 15 weight percent of salt in which the solid material is dispersed or suspended and a sufficient amount of starch and glyoxal to reduce the loss of water from the composition by filtration. The composition of the present invention may consist of any dispersion or suspension of a finely divided solid, such as clay and/or weighting agents and the like, in an aqueous liquid vehicle having dissolved therein about 2 to 15 weight percent of salt and also containing starch and glyoxal; the starch and glyoxal being present in an amount sufficient to substantially reduce the loss of water from the suspension or dispersion by filtration.

The finely divided solid material of the composition of my invention may, of course, be any finely divided solid which is capable of being dispersed or suspended in an aqueous liquid vehicle, and an example of such a dispersion or suspension is the drilling fluid used in rotary drilling of boreholes, which may include various solid materials as hereinbefore indicated.

The finely divided solid material employed in the practice of the present invention will ordinarily include clay, such as colloidal clay bodies. For example, I may use in my drilling mud or aqueous suspension, colloidal clays, such as Wyoming bentonite, El Paso surface clay, medium-yield drilling clays from Texas, clays containing the montmorillonites and especially sodium montmorillonite. The calcium montmorillonite clays may be employed and clays containing other suitable cationic combinations of the montmorillonites may be used. Sodium montmorillonite such as that encountered in Wyoming bentonite is included in the preferred type of clay. I also contemplate that I may use in the practice of my invention muds such as those produced when clayey subsurface formations are drilled. For example, mud obtained from a drilling well in Lake Raccourci in Louisiana may be found entirely suitable. Likewise, I may employ in my invention dried ground shale such as has been obtained from a well in West Cote Blanche Bay in Southern Louisiana. To a suitable suspension of colloidal clay of the type exemplified is added a suitable amount of starch and glyoxal. The amount of clay or solids to be used may range from about 5% by weight of the mud up to as high as about 75% by weight.

Ordinarily it will be desirable to use from about 1 to 15 pounds of starch per 42 gallon barrel of mud.

In accordance with the present invention, glyoxal is added to a starch-containing drilling mud in an amount sufficient to substantially reduce the water filtration loss below the loss occasioned through the use of starch alone. Generally speaking, satisfactory results are obtained through the use of about 0.5 to 5 pounds of glyoxal per 42 gallon barrel of mud. The glyoxal is preferably added as an aqueous solution for ease of mixing, such aqueous solutions normally containing about 10 to 40 percent by weight of glyoxal. For example, when utilizing a 30 weight percent solution of glyoxal, it is preferable to use about 1.5 to 15 pounds of the 30% solution per 42 gallon barrel of mud. It is to be understood, of course, that the amount of starch and the amount of glyoxal required to give the desired reduction in water filtration loss from a suspension of finely divided solids in an aqueous liquid vehicle will vary with circumstances over a comparatively wide range, and the amount of starch and glyoxal employed in a specific suspension or dispersion will depend upon the circumstances and the characteristics of the material treated.

The starch and glyoxal may be added to the saline drilling mud in any of the suitable manners known to those skilled in the art. As a specific example of the practice of the present invention, it may be desirable to employ aqueous solutions of starch and glyoxal. These solutions may then be incorporated with the aqueous dispersion or suspension of finely divided solids. If desired, the starch or glyoxal, or both, may be incorporated directly and without dilution by any suitable means. It may be convenient to use a "pre-gelatinized" starch which, when mixed into mud, will disperse readily.

When it is desired to reduce the filtration rate of a drilling mud, the aforementioned materials or solutions thereof may be incorporated with the mud at a suitable point in the mud circulation system, such as in the mud ditch or mud pits. In some situations it may be desirable to use a mixing device such as a cone and jet mixer, or the equivalent thereof, for incorporating the starch and glyoxal into the drilling mud.

The present invention may also be considered in connection with the following example which is given by way of illustration and which is not intended as a limitation on the scope of this invention.

EXAMPLE I

Drilling muds were prepared by incorporating a commercial clay consisting of a mixture of crude native Texas bentonite (crude calcium montmorillonite) with Wyoming bentonite (sodium montmorillonite) into aqueous saline salt solutions containing 5 and 25 weight percent, respectively, of dissolved salt. Starch alone was added to a portion of each of the muds to be tested as a control and both starch and glyoxal were added to other portions of the drilling muds. The thus prepared muds were then tested for viscosity, gel strength and filtration loss rate. The compositions prepared and the results obtained are set forth in Table I.

*Table I*

EFFECT OF ADDITION OF STARCH AND GLYOXAL ON PROPERTIES OF DRILLING MUDS

| Composition | Clay (Wt. Percent) | Aqueous Vehicle (Wt. Percent) | Salt Content of Aqueous Vehicle (Wt. Percent of Vehicle) | (Na$_2$CO$_3$) (Wt. Percent) | Starch (Wt. Percent) | Add'l. Amt. of Added Glyoxal (Lbs. per 42 Gallon Barrel) | Viscosity at 600 R. P. M. Stormer (cps.) | Initial Gel Strength (Grams Stormer) | API Filtration Rate, cc. in 30 Minutes |
|---|---|---|---|---|---|---|---|---|---|
| 1 | 20 | 78 | 5 | 1 | 1 | None | 32 | 25 | 39.4 |
| 1a | 20 | 78 | 5 | 1 | 1 | ¹ 1.25 | 27 | 18 | 17.1 |
| 2 | 20 | 78 | 5 | 1 | 1 | None | 32 | 23 | 38.6 |
| 2a | 20 | 78 | 5 | 1 | 1 | ¹ 1.4 | 27 | 18 | 17.1 |
| 3 | 24 | 74 | 25 | 1 | 1 | None | 18 | 0 | 31.2 |
| 3a | 24 | 74 | 25 | 1 | 1 | ¹ 1.4 | 17 | 0 | 22.5 |
| 4 | 24 | 74 | 25 | 1 | 1 | None | 23 | 0 | 34.3 |
| 4a | 24 | 74 | 25 | 1 | 1 | ¹ 1.4 | 22 | 0 | 28.1 |

¹ Added as 30 wt. percent aqueous glyoxal solution.

From Table I it is seen that with respect to compositions 1 and 2 wherein the aqueous vehicle contained 5% of dissolved salt, filtration rates of about 39.4 and about 38.6 cc.'s in 30 minutes were obtained whereas with compositions 1a and 2a (prepared in accordance with the present invention) the filtration rate was reduced to about 17.1 cc. in 30 minutes. The results show that the addition of glyoxal substantially materially reduced the filtration rate.

With respect to compositions 3 and 4, wherein the aqueous vehicle contained 25 percent of dissolved salt, being substantially completely saturated, it will be noted that filtration rates of 31.2 and 34.3 cc. in 30 minutes were obtained and that the addition of glyoxal (compositions 3a and 4a), although beneficial, did not result in a reduction in filtration rate comparable with the reduction obtained in the case of compositions 1a and 2a. These results illustrate that the most improved results of the present invention are obtained when the aqueous vehicle contains not more than about 15 weight percent of dissolved salt.

The nature and objects of the present invention having been fully described and illustrated, what is claimed is:

1. A drilling mud comprising at least 5% by weight of finely divided solids and water having about 2 to 15 percent by weight of salt dissolved therein to which has been added amounts of starch and glyoxal sufficient to substantially reduce the water filtration loss rate of said drilling mud, said drilling mud containing from about 0.5 to 5 pounds of glyoxal and about 1 to 15 pounds of starch per 42-gallon barrel of drilling mud.

2. In a process for drilling a well with well drilling tools in which there is circulated in the well a water base drilling mud containing at least about 5% by weight of finely divided solids, said water base containing about 2 to 15 percent by weight of dissolved salt, the method of forming a filter cake on the wall of said well to decrease the loss of water into a permeable formation penetrated by said well which comprises admixing with said drilling mud amounts of starch and glyoxal sufficient to substantially lower the filtration rate of said mud, and contacting said wall of said well with the thus-resulting drilling mud to form said filter cake thereon, said thus-resulting drilling mud containing from about 1 to about 15 pounds of starch and from about 0.5 to about 5 pounds of glyoxal per 42-gallon barrel of drilling mud.

3. A process as in claim 2 wherein the glyoxal is admixed with said drilling mud in the form of an aqueous solution containing from about 10 to 40 weight percent of glyoxal.

4. A drilling mud comprising at least 5% by weight of finely divided solids and water having about 2 to 15 percent by weight of salt dissolved therein to which has been added amounts of starch and glyoxal sufficient to substantially reduce the water filtration loss rate of said drilling mud, said drilling mud containing from about 0.5 to 5 pounds of glyoxal and about 1 to 15 pounds of starch per 42-gallon barrel of drilling mud, said glyoxal having been added in the form of an aqueous solution containing from about 10 to 40 weight per cent of glyoxal.

References Cited in the file of this patent

UNITED STATES PATENTS

| | | |
|---|---|---|
| 2,399,986 | Chapman | May 7, 1946 |
| 2,557,473 | Ryan | June 19, 1951 |
| 2,600,404 | Hoeppel | June 17, 1952 |